United States Patent
Gahres (10) Patent No.: US 9,144,197 B2
(45) Date of Patent: Sep. 29, 2015

(54) DUAL CONVEYOR INFEED FOR A HEADER OF AN AGRICULTURAL HARVESTER

(71) Applicant: CNH America LLC, New Holland, PA (US)

(72) Inventor: Ryan Gahres, Richland, PA (US)

(73) Assignee: CNH Industrial America LLC, New Holland, PA (US)

( * ) Notice: Subject to any disclaimer, the term of this patent is extended or adjusted under 35 U.S.C. 154(b) by 145 days.

(21) Appl. No.: 14/071,357

(22) Filed: Nov. 4, 2013

(65) Prior Publication Data

US 2015/0121830 A1 May 7, 2015

(51) Int. Cl.
*A01D 57/00* (2006.01)
*A01D 57/20* (2006.01)
*A01D 34/00* (2006.01)

(52) U.S. Cl.
CPC .............. *A01D 57/20* (2013.01); *A01D 34/008* (2013.01)

(58) Field of Classification Search
CPC ..... A01D 34/30; A01D 34/008; A01D 41/14; A01D 41/00; A01D 43/06; A01D 57/20; A01D 61/02; A01D 61/008; A01F 12/10
USPC .............. 56/14.5, 14.6, 14.9, 15.4, 16.6, 153, 56/181, 189, 208; 460/13, 20, 69, 70, 101
See application file for complete search history.

(56) References Cited

U.S. PATENT DOCUMENTS

| | | | |
|---|---|---|---|
| 582,798 A | 5/1897 | Pridmore | |
| 589,439 A | 9/1897 | Loger | |
| 597,635 A | 1/1898 | Coombs | |
| 1,489,961 A | 4/1924 | Orth | |
| 3,456,429 A | 7/1969 | Sexton | |
| 4,262,475 A | 4/1981 | Takahashi et al. | |
| 4,382,471 A | 5/1983 | Peterson | |
| 4,722,175 A | 2/1988 | Hobhouse | |
| 5,083,417 A | 1/1992 | Jeronimidis et al. | |
| 5,464,371 A * | 11/1995 | Honey | 460/20 |
| 5,497,605 A | 3/1996 | Underwood et al. | |
| 5,964,081 A | 10/1999 | Ingram | |
| 6,226,967 B1 | 5/2001 | Staiger | |
| 7,587,885 B2 * | 9/2009 | Tippery et al. | 56/14.5 |
| 8,438,824 B2 * | 5/2013 | Sauerwein et al. | 56/208 |
| 2007/0251203 A1 | 11/2007 | Coers et al. | |

FOREIGN PATENT DOCUMENTS

GB 2067434 A 7/1981
WO 8502315 6/1985

* cited by examiner

*Primary Examiner* — Robert Pezzuto
(74) *Attorney, Agent, or Firm* — Patrick M. Sheldrake; Seyed V. Sharifi T.

(57) ABSTRACT

Improved headers of a combine harvester are disclosed. The headers include structure in the form of upper and lower infeed conveyors which cooperate to maintain compressive contact with a flow of crop material that is being conveyed by the belts to the header outlet regardless of the flow characteristics of the mat of material being conveyed. The result is a consistent flow of crop material being passed through the header which results in more efficient harvester operation and more productive crop yield.

20 Claims, 4 Drawing Sheets

DUAL CONVEYOR INFEED FOR A HEADER OF AN AGRICULTURAL HARVESTER

BACKGROUND

The subject application relates generally to a header for use with agricultural harvesters. In particular, the subject application relates to a dual conveyor infeed for a header of a combine harvester.

The headers for agricultural harvesters, such as combines, that harvest crops may assume a variety of configurations depending on the crop being harvested. In any case, harvester headers include devices for conveying harvested crop to a feederhouse after which the crop undergoes additional processing. After the crop is cut by a cutting knife or other cutting mechanism, it is typically gathered for example by a reel that transports the crop to a header conveyor device which may include one or more augers or belt conveyors. Generally, the header conveyor device includes an opposed set of lateral augers (as in an auger header) or belts (as in a draper header) which transfer crop from lateral ends of the header toward a feederhouse opening located at a central region of the header. The feederhouse extends generally perpendicular to the conveyor augers or belts. In draper headers, for example, a central infeed belt and a central infeed auger are provided in order to impel the crop flowing from the lateral belts into the feederhouse opening. The central infeed auger spans the feederhouse opening and has helical vanes which terminate at the opposite ends of the infeed auger.

It has been observed that during operation of an agricultural harvester having a header equipped with a feederhouse infeed auger that the outer ends of the rotating infeed auger vanes interfere with the laterally incoming crop flow. This interference between the infeed auger vanes and the incoming crop flow causes crop to collect at the opposite ends of the infeed auger. The collected crop in turn results in an inconsistent flow of crop being fed by the infeed auger to the feederhouse. The inconsistent crop flow may include "dead zones" where little or no crop is present and is not actively being transported or moved and heavy zones where excessive crop is present. Grain processed through the header can accumulate at the dead zones or voids and thereby negatively impact the overall efficiency and operation of the combine during harvesting operations. Furthermore, in conventional combine harvesters, due to the overall cylindrical shape of the header's cross auger and the feederhouse feed drum, there exists a region or void space between them at or below their respective central rotational axes that grain is not actively transported. Because of this void and lack of any active transport means between the cross auger and feeder drum grain flow may become inhibited and back up. That is, grain is only passively conveyed between the cross auger and the feeder drum through the void in conventional combines. Such inconsistent crop flow results in inconsistent demands being placed on the entire harvesting machine. Therefore, machine settings including engine speed and other parameters must be continually adjusted to accommodate for the effects of the inconsistent flow of crop which may lead to more energy being used by the harvester than might otherwise be necessary to harvest the crop. Furthermore, some of the crop which collects at the outer ends of the infeed auger may be forced over the auger such that it is not picked up by the feederhouse conveyor and is left in the field, thereby resulting in a less than optimal crop harvest.

BRIEF SUMMARY

The subject application provides a header for an agricultural harvester wherein the header delivers cut crop in a consistent manner to the feederhouse and reduces crop being left in the field. The headers include improved infeed systems including upper and lower infeed conveyors that cooperate to deliver substantially consistent flows of harvested grain to the feederhouse regardless of whether the grain being harvested is large and bushy or fine and thin. The upper infeed conveyor and the lower infeed conveyor define a variable, funnel-like throat through which masses of flowing crop may pass to the feederhouse in a consistent and efficient manner. The upper infeed conveyor is vertically movable relative to the lower infeed conveyor based upon a flow characteristic of the flow of grain received by the first and second infeed conveyors. In particular, the upper infeed conveyor is mounted on a pivot about which it may pivot upwardly and downwardly in order to accommodate variable rates of grain being transported by the lower infeed conveyor. Together, the first and second conveyors engage and compress or "sandwich" the flow of crop without causing crop to collect at the feederhouse opening. The result is a more consistent flow of crop to the feederhouse. Additional devices may be provided to vary the compressive force applied by the second infeed conveyor in order to promote consistent conveyance of variable rates of crop flow. The upper and lower infeed conveyors can be e.g., a belt conveyor.

In accordance with a first aspect, the subject application provides a header for an agricultural harvester. The header includes a frame or chassis that is connectable to an agricultural harvester and an outlet for delivering grain to a feederhouse. A crop cutter is mounted on the chassis and a laterally extending header conveyor is provided which receives grain harvested by the crop cutter and conveys the harvested grain towards the outlet. The header further includes cooperating first and second conveyors or infeed conveyors. The first conveyor lies adjacent the outlet and receives a flow of grain from the laterally extending header conveyor and conveys the flow of grain rearwardly toward the outlet. The second conveyor is disposed diametrically opposed to the first conveyor and simultaneously with the first conveyor facilitates conveying the flow of grain toward the outlet, e.g., by funneling and compressing the flow of grain. The second conveyor is movable relative to the first conveyor. The header may further include a sensor for detecting a flow characteristic of the flow of grain received by the first conveyor and the second conveyor is movable relative to the first conveyor based upon the detected flow characteristic of the flow of grain received by the first conveyor.

In accordance with a second aspect, the subject application provides a header for an agricultural harvester including a chassis, a crop cutter mounted on the chassis and a header conveyor. The header conveyor receives grain harvested by the crop cutter and conveys the grain towards an outlet of the header. The header further includes a first conveyor for receiving a flow of grain from the header conveyor and conveying the flow of grain rearwardly towards the outlet. The first conveyor extends towards the outlet terminating at a position immediately adjacent the outlet. The header further includes a second conveyor disposed diametrically opposed to the first conveyor and extending towards the outlet terminating at a position immediately adjacent the outlet for simultaneously engaging the flow of grain conveyed by the first conveyor for compressing and conveying the flow of grain toward the outlet. The second conveyor includes a substantially planar anterior deflecting surface for deflecting the flow of grain in between the first and second conveyors.

In accordance with a third aspect, the subject application provides a header for an agricultural harvester including a chassis, a crop cutter mounted on the chassis, a header conveyor, a first conveyor, a second conveyor and a mounting assembly. The header conveyor receives grain harvested by the crop cutter and conveys the grain towards an outlet of the header. The first conveyor receives a flow of grain from the header conveyor and conveys the flow of grain rearwardly towards the outlet. The second conveyor is disposed diametrically opposed to and above the first conveyor to sandwich and simultaneously engage the flow of grain conveyed by the first conveyor for compressing and conveying the flow of grain toward the outlet. The mounting assembly mounts the second conveyor to the header. The mounting assembly includes a linkage having a first end pivotably connected to the chassis and a second end opposite the first end pivotably connected to a frame of the second conveyor. The mounting assembly further includes an actuator pivotably mounted to the chassis and engaged with the linkage for moving the linkage between at least first and second positions and biasing the second conveyor against the flow of grain.

An advantage of headers constructed according to the subject application is that harvested grain is delivered to the feederhouse in a highly consistent manner regardless of the characteristics of the flow of grain being conveyed. That is, large and bushy crops as well as fine and thin crops can be conveyed to the feederhouse with equal effectiveness and with minimal resistance by the first and second infeed conveyors e.g., in a spread out evenly distributed manner across the entire width of the infeed conveyor. As a result, engine speed and other machine settings require less adjustment during operation of the harvester and less energy is consumed by the harvester. A further advantage of headers constructed according to the subject application is that grain and material other than grain (MOG) does not bunch up and collect at the lateral ends of the first and second infeed conveyors. Furthermore, the first and second infeed conveyors may be constructed and arranged so as to define a funnel-like mouth for simultaneously pulling the crop downwardly and rearwardly during conveyance. That is, the first and second conveyors define an inlet for receiving the flow of grain and an outlet for discharging the flow of grain. The inlet can be larger than the outlet for funneling the flow of grain from the inlet to the outlet. Consequently, crop is not deposited back onto the field and grain yield is correspondingly increased.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain" and "grains" are used throughout the specification for convenience and it should be understood that these terms are not intended to be limiting. Thus, "grain" and "grains" refers to that part of a crop which is harvested and separated from discardable portions of the crop.

Figure 1:
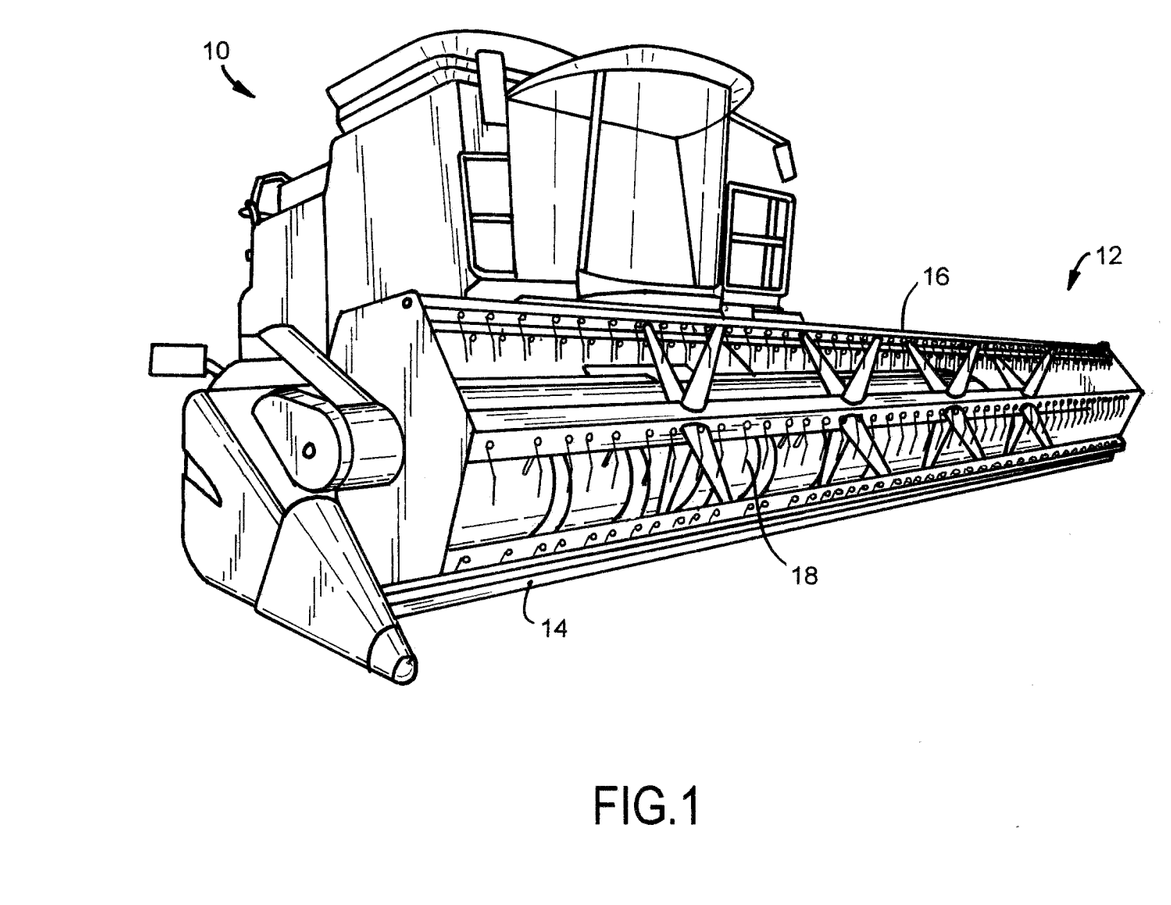
FIG. 1 is a perspective view of an agricultural harvester including a header.

Referring now to the drawings, wherein aspects of the subject application are shown, FIG. 1 illustrates an agricultural harvester applicable to the subject application in the form of a combine harvester 10 to which is attached a header 12. The header 12 has a crop cutter or knife assembly 14 arranged close the ground. The knife assembly can include a stationary blade and a reciprocating blade which together act as shears that cut the crop near the ground. A harvesting reel 16 having tines 18 rotates about a horizontal axis adjacent to the knife assembly 14 to gather the cut crop and feed it into unillustrated processing machinery of the harvester. While a draper header is used herein for purposes of illustrating the subject application, other headers can be used with the various aspects disclosed herein.

Figure 2:
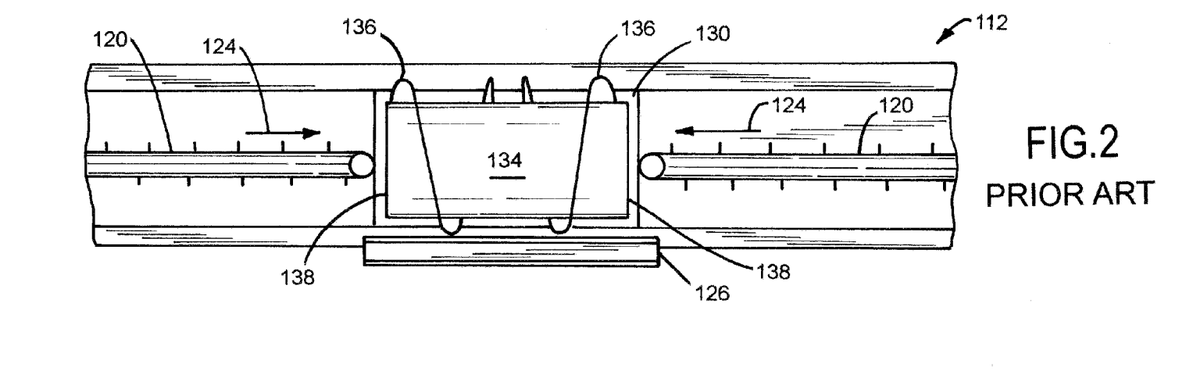
FIG. 2 is a partial schematic front elevation view of a conventional header for an agricultural harvester.
Figure 3:
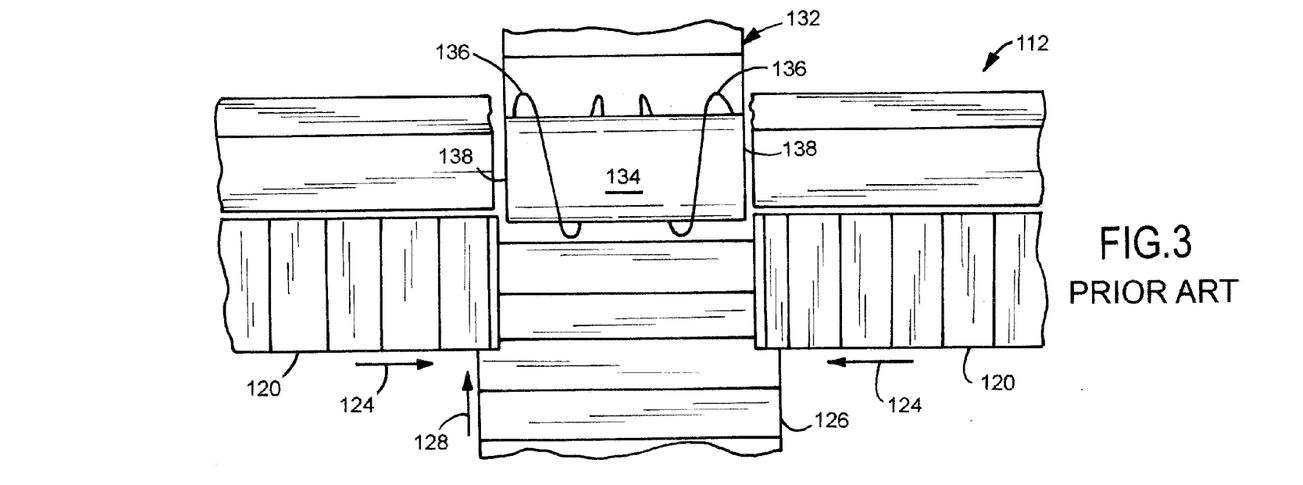
FIG. 3 is a partial schematic top plan view of the header of FIG. 2.
Figure 4:
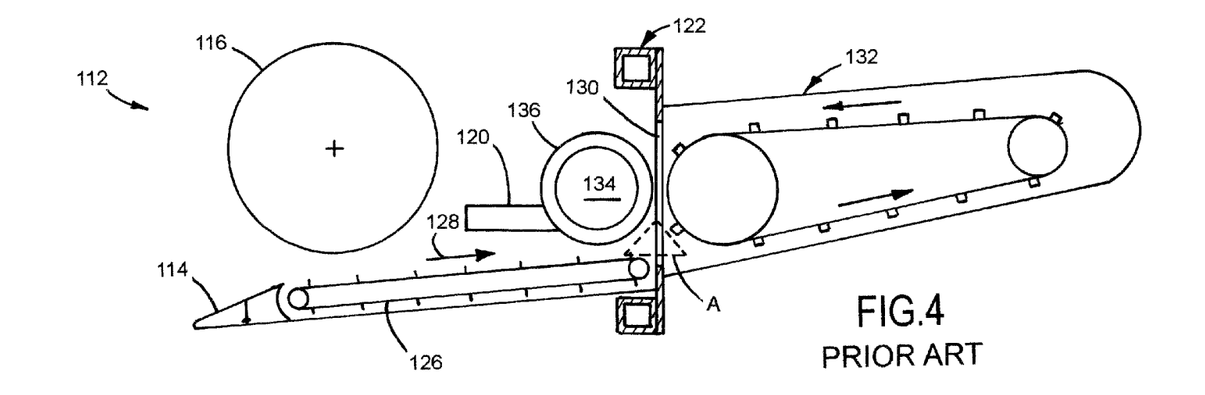
FIG. 4 is a schematic elevational cross-section view of a conventional header for an agricultural harvester taken along a centerline of the header.

Turning to FIGS. 2 through 4, there are shown several views of a header assembly 112 of conventional construction. The header assembly 112 includes a crop cutter and harvesting reel 116 (FIG. 4) followed rearwardly by a crop or grain conveyor system. The harvesting reel 116 gathers the crop cut by the crop cutter 114 and delivers the cut crop to a conveyor system. The conveyor system typically includes a header conveyor constructed as a pair of opposed, laterally extending conveyors 120 which extend from the lateral ends of the header frame or chassis 122 (shown in cross-section in FIG. 4) toward a generally central region of the chassis. As indicated by arrows 124 of FIGS. 2 and 3, cut crop is delivered by conveyors 120 toward a centrally located infeed conveyor 126. Infeed conveyor 126 extends substantially perpendicular to conveyors 120 and is driven by conventional belt drive means (not illustrated) to move crop in the direction of arrows 128 toward an outlet 130 (FIGS. 2 and 4) which leads to a feederhouse 132.

As seen in FIGS. 2 through 4, before reaching outlet 130, the cut crop first encounters a centrally located rotatable infeed auger 134 which impels the crop or grain through the outlet 130. More specifically, the cut crop is engaged by the helical vanes or flights 136 of the infeed auger 134 and is pushed thereby through outlet 130.

It has been observed that conventional conveyor systems with infeed augers suffer certain disadvantages. Most notably, cut crop or grain has a tendency to collect at the lateral ends 138 of the infeed auger 134 (FIGS. 2 and 3) resulting in crop material buildup that impacts the flow of crop or grain through the header assembly. Specifically, clumps of crop material at the lateral ends of the infeed auger tend to cause considerable variations in the flow of the crop material that is conveyed between the infeed conveyor 126 and infeed auger 134 through the outlet 130. That is, the clumped grain and MOG at the ends of the infeed auger 134 causes both dead zones and heavy zones in the mat of grain being conveyed. Dead zones are areas where little or no crop or grain is actively passed to the feederhouse 132 whereas heavy zones are areas where large amounts of crop or grain are passed to the feederhouse.

This problem is further exacerbated by the construction and arrangement of the header's infeed auger 134 and the feederhouse feed drum. In conventional combine harvesters, due to the overall cylindrical shape of the header's infeed auger 134 and the feederhouse feed drum, there exists a region or void space between them at or below their respective central rotational axes that grain is not actively transported, i.e., a dead zone A (FIG. 4). This void and lack of any active transport between the infeed auger and feederhouse drum causes grain flow to become inhibited and back up at this location. That is, grain is only passively conveyed between the infeed auger and the feederhouse drum through the void in conventional combines. The result of this inconsistent flow of grain is inconsistent handling and processing of grain by the feederhouse and downstream grain processing equipment carried by the combine harvester. Such inconsistencies in turn necessitate frequent adjustment of harvester engine speed and other machine settings during operation of the harvester. As a result, the harvester operates at less than optimal efficiency and uses more energy than would be necessary if a comparatively consistent flow of crop material were passed from the header 112 to the feederhouse 132 through outlet 130.

It has also been observed that the clumps of grain at the ends of the infeed auger 134 oftentimes collect to the point where cut crop passes over the tops of the auger flights or vanes 136. In such circumstances, the crop material that is not engaged by the auger vanes 136 may pass over the frame or chassis 122 and fall into the field being harvested where it cannot be processed by the harvester. As a consequence the harvested crop yield is less than optimal.

Figure 5:
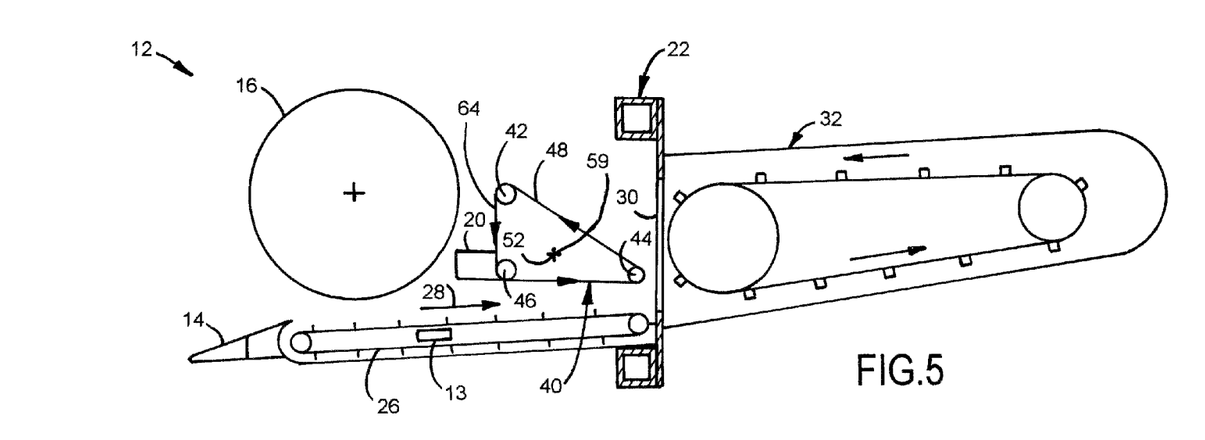
FIG. 5 is a schematic elevational cross-section view of an agricultural harvester header according to the subject application taken along a centerline of the header.

Referring now to FIG. 5, there is shown a cross-section of a header 12 according to an aspect of the subject application. The header 12 includes a frame or chassis 22 upon which is mounted a crop cutter 14 and a harvesting reel 16 which function in the manner generally described above in connection with FIG. 1. The header further includes a header conveyor 20 in the form of two opposed laterally extending belt conveyors (only one of which is shown in FIG. 5) that convey grain and other cut crop material harvested by the harvesting reel toward a header outlet 30. More specifically, the lateral conveyors of header conveyor 20 deliver cut crop to a first conveyor 26 which can be constructed similar in structure and function to infeed belt conveyor 126 described above. For example, the first conveyor 26 can be a belt conveyor. The first conveyor 26 or first infeed conveyor receives a flow of grain from the header conveyor 20 and transports the material rearwardly toward outlet 30 in the direction of arrow 28. Before reaching the outlet 30, however, the flow of grain encounters a second conveyor 40 disposed diametrically opposed e.g., above the first conveyor 26. As shown in FIG. 5, the second conveyor is configured as a belt conveyor. As will be described in greater detail below, the second conveyor simultaneously engages and sandwiches the flow of grain conveyed by the first conveyor 26 while facilitating conveying of the grain by funneling and compressing the flow of grain toward the outlet 30.

The first and second conveyors 26, 40 terminate at a position immediately adjacent the header outlet 30. In particular, the first and second conveyors 26, 40 are positioned so as to terminate about a rearward portion of the chassis within where dead zone A would otherwise exist. The close proximity of the ends of the first and second conveyors 26, 40 to the outlet 30 functions to provide a substantially continuous flow of grain from the conveyors to the feederhouse 32 and preclude the flow of grain from being hindered downstream of the first and second conveyors. The first and second conveyors 26, 40 further define a conveyor inlet for receiving the flow of grain and a conveyor outlet for discharging the flow of grain. The conveyor inlet is larger than the conveyor outlet for funneling the flow of grain from the conveyor inlet to the conveyor outlet.

As also discussed in greater detail hereinafter, the second conveyor 40 is movable relative to the first conveyor 26 between at least first and second positions based on at least one flow characteristic of the flow of grain received by the first conveyor 26, such as mass flow rate, volumetric flow rate, weight, density, speed or the like. The flow characteristic can be detected by at least one or more sensors 13 located proximate the first conveyor 26. Sensors 13 are electronically connected via suitable processing circuitry to controls of the combine that permit manual and/or automated operation of the header conveyor and in particular the first and second conveyors.

As seen in FIG. 5, the second conveyor 40 is configured as a belt conveyor that includes an aft roller, a fore roller disposed above the aft roller, and an endless belt extending between the aft and fore rollers thereby defining an inlet formed by the first and second conveyors that is larger than an outlet formed by the first and second conveyors. More particularly, the second conveyor includes a fore roller 42 and an aft roller 44. The second infeed belt conveyor may also include an intermediate roller 46. An endless belt 48 is entrained about the rollers of the second infeed belt conveyor. The fore roller 42 is disposed above the aft roller 44 and may be disposed essentially directly above the intermediate roller 46 (if present). However, for reasons discussed in connection with the description of FIG. 6, the fore roller 42 may reside not only above but forwardly of the intermediate roller 46. In any case, the first and second infeed belt conveyor arrangement according to the subject application defines an inlet formed by the first and second conveyors that is larger than an outlet formed by the first and second conveyors that minimizes collection of crop or grain at the infeed conveyors and provides a substantially consistent flow of grain to the outlet 30.

The second infeed belt conveyor 40 is pivotably connected to the header. For example, the second infeed belt conveyor can be mounted on a pivot 59 (FIGS. 6 and 7) which is constructed and arranged to define a horizontal pivot axis 52. Pivot 59 enables the second infeed belt conveyor 40 to vary its pitch about the axis 52 thereby allowing the fore and aft ends of the second conveyor to move in a vertical direction relative to the first infeed belt conveyor 26. The significance of this capability is that it allows the second infeed belt conveyor 40 to maintain contact with and compress or bias the flow of grain as it passes between the first and second infeed belt conveyors 26, 40. Thus, whether the mat of flowing grain from the lateral conveyors presents low spots or high spots, the infeed belt conveyors 26, 40 will remain in positive compressive contact with the flow of grain so that the grain is sandwiched as it flows between the infeed belt conveyors whereby it is discharged in a substantially consistent fashion through outlet 30 and into feederhouse 32. The result is an essentially consistent flow of grain passing through the throat defined by the first and second infeed belt conveyors. Such consistent flow of grain translates into in less adjustment of machine settings, more consistent power needs and less energy consumed by the agricultural harvester during operation thereof.

Figure 6:
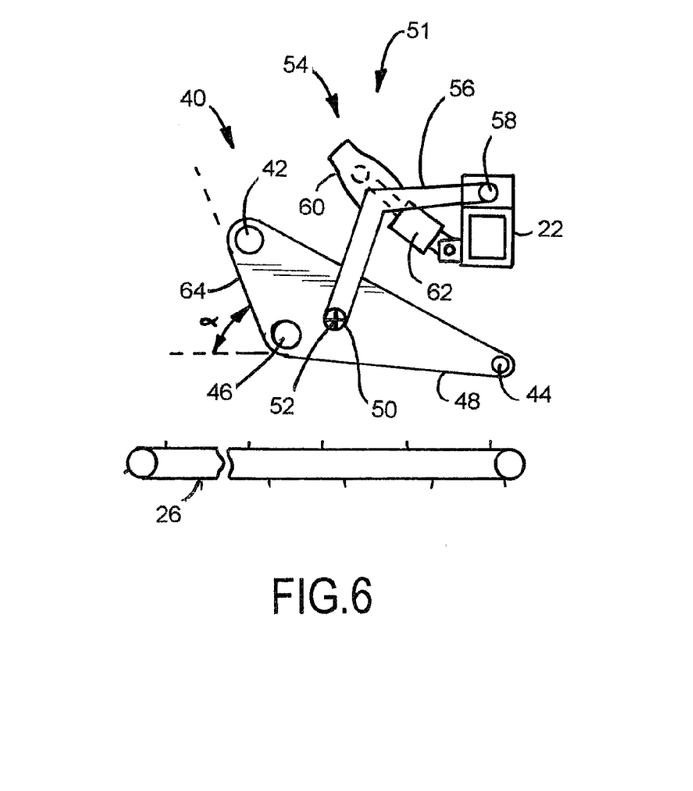
FIG. 6 is a partial schematic side elevation view of a mechanism for supporting an upper infeed belt conveyor according to an aspect of the subject application.
Figure 7:
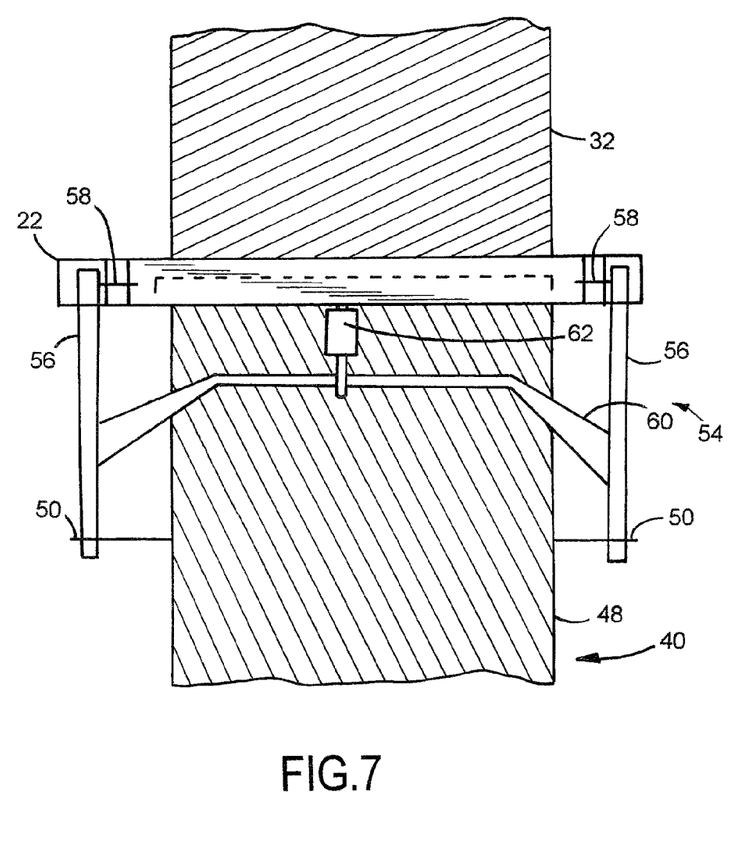
FIG. 7 is a partial schematic top plan view of the mechanism shown in FIG. 6.

Referring to FIGS. 6 and 7, there is depicted a further aspect of the subject application. As seen in FIGS. 6 and 7, there is shown a mounting assembly 51 for mounting the second infeed belt conveyor 40 to the header 12. In accordance with the subject application, and by way of non-limiting example, the mounting assembly 51 includes a linkage 54 having one end pivotably connected to the header frame or chassis 22 and an opposite end pivotably connected to a frame of the second conveyor 40. The mounting assembly 51 further includes an actuator 62 pivotably mounted to the chassis and engaged with the linkage for moving the linkage between at least first and second positions and biasing the second conveyor against the flow of grain.

The linkage 54 may be any apparatus that enables the second conveyor to move between first and second positions in a vertical direction relative to the first conveyor. Linkage 54 may permit vertical movement of the second infeed belt conveyor relative to the first infeed belt conveyor 26 such as along an inclined path relative to horizontal as the second conveyor is moved between first and second positions. In a first position the second conveyor exerts greater biasing force against the flow of grain and in a second position the second conveyor exerts lesser biasing force against the flow of grain.

According to the illustrated example, linkage 54 provides a pivotable mounting of the second conveyor to the chassis. Linkage 54 includes a pair of arms 56 located on opposite lateral sides of the second infeed belt conveyor 40. A first end of each arm 56 is pivotably connected to the header chassis 22 at a pivot 58 and a second end of each arm 56 is pivotably connected to a frame of the second infeed belt conveyor 40 at pivot 59. A cross member 60 integrally connects the arms 56 so that they move in unison upwardly and downwardly. It will be understood that the weight of the second infeed belt conveyor 40 and its associated linkage 54 may under certain circumstances be sufficient to maintain compressive engagement of the crop or grain flowing between the second infeed belt conveyor 40 and the first infeed belt conveyor 26. However, to ensure reliable contact of the second infeed belt conveyor with the flowing crop or grain, linkage 54 may be provided with one or more actuators 62 connected to the second conveyor and the chassis for moving the second infeed belt conveyor in a vertical direction relative to the first infeed belt conveyor and for exerting a downward force or bias against the second infeed belt conveyor. By way of example but not limitation, such devices may include one or more tension, compression or torsion springs or extendable and retractable linear actuators such as single or double acting hydraulic or pneumatic cylinders, screw jacks or the like.

In the illustrated example shown in FIGS. 6 and 7, the actuator 62 may be at least one hydraulic cylinder having a first end pivotably connected to the header frame or chassis 22 and a second end opposite the first end pivotably connected to the cross member 60. So constructed and arranged, it will be understood that operation of the actuator 62 in a first direction increases downward force exerted by the second infeed belt conveyor 40 against the flow of grain whereas operation of the actuator in a second or opposite direction reduces downward force exerted by the second infeed belt conveyor against the flow of grain. In the illustrated example, retraction of the actuator 62 increases the downward force exerted by the actuator on the second conveyor 40 and extension of the actuator reduces the downward force exerted by the actuator on the second conveyor. Thus, it will be appreciated that the linkage 54 may be operable to exert variable downward compressive forces against the flowing grain to ensure that such material, whether thick and bushy or thin and fine, passes the through the outlet 30 in substantially continuous and consistent fashion. Furthermore, the pivoted connection 58 of linkage 54 with header frame 22 permits the linkage and thus the second infeed belt conveyor 40 to be raised upwardly to release excessive masses of crop or grain that might occasionally accumulate between the first and second infeed belt conveyors.

In addition, it will be understood that the second conveyor 40 can be configured to move automatically relative to the first conveyor 26 based upon a flow characteristic of the flow of grain detected by sensor 13, as described in the above aspect of the subject application. Specifically, the actuator 62 is operatively in communication with a sensor 13 that detects a flow characteristic of the flow of grain received by the first conveyor and configured to move the second conveyor in a direction in response to the detected flow characteristic so that the second conveyor applies a bias on the flow of grain. Further, when the second conveyor is a belt conveyor having an endless belt, it is the endless belt of the second conveyor that biases the flow of grain.

The second infeed belt conveyor 40 may be driven solely by frictional contact with or grain flowing between it and the power-driven first infeed belt conveyor 26. However, it is also contemplated that the second infeed belt conveyor may itself be driven at a constant or variable speed by an unillustrated motor which further promotes reliable and consistent passage of grain between the first and second infeed belt conveyors. The second conveyor drive motor may be reversible as may the motor which drives the first infeed belt conveyor 26 so that each motor may drive its respective infeed belt conveyor away from rather than toward the outlet 30 in order to effectively discharge clogs or plugs of crop material that may occasionally accumulate at the outlet. It will be understood that such clogs may be observed visually or may be detected by sensor 13.

Referring back to FIGS. 5 and 6, there is shown the respective positioning of the fore and aft rollers 42, 44 of the second infeed belt conveyor 40. According to the present aspect, in which an optional intermediate roller 46 is also present, the fore roller 42 is disposed vertically above the aft roller 44 and the intermediate roller 46. As seen in FIG. 5, the fore roller 42 is disposed substantially directly above the intermediate roller 46 and in FIG. 6 the fore roller is positioned above and forwardly of the intermediate roller at an acute angle α relative to horizontal. In both cases, the second infeed belt conveyor 40 forms a substantially planar anterior deflecting surface 64 by a portion of endless belt 48 extending between the fore and intermediate rollers 42, 46 for facilitating funneling of the flow of grain to the header outlet. A particular advantage of the roller arrangement shown in FIG. 6 is that the first and second infeed belt conveyors define a funnel-like mouth that is especially useful in harvesting larger, bushier crop. More specifically, the sloped belt surface of the anterior face 64 between the fore and intermediate rollers 42, 46 operates to simultaneously pull the crop downwardly and rearwardly thereby leveling off the flow of grain entering between the first and second conveyors. Consequently, the likelihood that cut crop might reach the upper run of the second infeed belt conveyor and be launched forward toward the harvesting reel or deposited back into the field is minimized and crop recovery is correspondingly optimized.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A header for an agricultural harvester comprising:
a chassis;
a crop cutter mounted on the chassis;
a header conveyor for receiving grain harvested by the crop cutter and conveying the grain towards an outlet of the header;
a first conveyor adjacent the outlet for receiving a flow of grain from the header conveyor and conveying the flow of grain rearwardly towards the outlet;
a sensor for detecting a flow characteristic of the flow of grain received by the first conveyor; and
a second conveyor disposed diametrically opposed to the first conveyor for simultaneously engaging the flow of grain conveyed by the first conveyor to facilitate conveying the flow of grain toward the outlet, wherein said second conveyor is movable relative to said first conveyor based upon the detected flow characteristic of the flow of grain received by the first conveyor.

2. The header of claim 1, wherein the flow characteristic is at least one of mass flow rate, volumetric flow rate, weight, density and speed.

3. The header of claim 1, wherein said second conveyor is a belt conveyor comprising an aft roller, a fore roller disposed above said aft roller, and an endless belt extending between the aft and fore rollers thereby defining an inlet formed by the first and second conveyors that is larger than an outlet formed by the first and second conveyors.

4. The header of claim 1, wherein said second conveyor is configured to move between first and second positions in a vertical direction relative to said first conveyor.

5. The header of claim 4, wherein said second conveyor is pivotably mounted to said chassis.

6. The header of claim 5, further comprising an actuator connected to said second conveyor and said chassis for moving said second conveyor in a vertical direction relative to said first conveyor.

7. The header of claim 1, wherein said second conveyor is a belt conveyor comprising a fore roller, an aft roller and an intermediate roller, wherein said fore roller is disposed above and forwardly of said intermediate roller at an acute angle relative to horizontal thereby forming a substantially planar anterior deflecting surface for directing the flow of grain in between the first and second conveyors.

8. The header of claim 1, wherein said first and second conveyors define an inlet for receiving the flow of grain and an outlet for discharging the flow of grain, wherein the inlet is larger than the outlet for funneling the flow of grain from the inlet to the outlet.

9. The header of claim 1, wherein said first and second conveyors extend immediately adjacent to the outlet of the header.

10. A header for an agricultural harvester comprising:
a chassis;
a crop cutter mounted on the chassis;
a header conveyor for receiving grain harvested by the crop cutter and conveying the grain towards an outlet of the header;
a first conveyor for receiving a flow of grain from the header conveyor and conveying the flow of grain rearwardly towards the outlet, wherein the first conveyor extends towards the outlet terminating at a position immediately adjacent the outlet; and
a second conveyor disposed diametrically opposed to the first conveyor and extending towards the outlet terminating at a position immediately adjacent the outlet for simultaneously engaging the flow of grain conveyed by the first conveyor for compressing and conveying the flow of grain toward the outlet, wherein the second conveyor has a substantially planar anterior deflecting surface for deflecting the flow of grain in between the first and second conveyors.

11. The header of claim 10, further comprising a sensor for detecting a flow characteristic of the flow of grain received by the first conveyor.

12. The header of claim 11, wherein the flow characteristic is at least one of mass flow rate, volumetric flow rate, weight, density and speed.

13. The header of claim 10, wherein said second conveyor is configured to move relative to said first conveyor based upon a flow characteristic of the flow of grain received by the first conveyor.

14. The header of claim 10, wherein said second conveyor is configured to move between first and second positions in a vertical direction relative to said first conveyor.

15. The header of claim 10, wherein said second conveyor is a belt conveyor comprising a fore roller, an aft roller and an intermediate roller, and wherein said substantially planar anterior deflecting surface is formed by a portion of an endless belt extending between the fore and intermediate rollers.

16. The header of claim 15, wherein said fore roller is disposed above and forwardly of said intermediate roller at an acute angle relative to horizontal.

17. A header for an agricultural harvester comprising:
a chassis;
a crop cutter mounted on the chassis;
a header conveyor for receiving grain harvested by the crop cutter and conveying the grain towards an outlet of the header;
a first conveyor adjacent the outlet for receiving a flow of grain from the header conveyor and conveying the flow of grain rearwardly towards the outlet;
a second conveyor disposed above the first conveyor to sandwich and simultaneously engage the flow of grain conveyed by the first conveyor for conveying the flow of grain toward the outlet; and
a mounting assembly for mounting the second conveyor to the header comprising:
a linkage that includes a first end pivotably connected to the chassis and a second end opposite the first end pivotably connected to a frame of the second conveyor, and
an actuator pivotably mounted to the chassis and engaged with the linkage for moving the linkage between at least first and second positions and biasing the second conveyor against the flow of grain.

18. The header of claim 17, wherein in moving the linkage between first and second positions, the second conveyor is moved along an inclined path relative to horizontal.

19. The header of claim 18, wherein the actuator is operatively in communication with a sensor that detects a flow characteristic of the flow of grain received by the first conveyor and configured to move the second conveyor in a direction in response to the detected flow characteristic so that the second conveyor applies a bias on the flow of grain.

20. The header of claim 19, wherein the second conveyor is a belt conveyor and an endless belt of the second conveyor biases the flow of grain.

\* \* \* \* \*